(12) United States Patent
Yamada

(10) Patent No.: US 7,614,658 B2
(45) Date of Patent: Nov. 10, 2009

(54) LIGHT ALLOY EXTRUDED FRAME

(75) Inventor: Takayuki Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/971,543

(22) Filed: Jan. 9, 2008

(65) Prior Publication Data
US 2008/0164684 A1    Jul. 10, 2008

(30) Foreign Application Priority Data
Jan. 10, 2007    (JP)    ............... 2007-002818

(51) Int. Cl.
   *B62D 21/015*    (2006.01)
(52) U.S. Cl. .............. 280/784; 296/187.09; 296/203.02
(58) Field of Classification Search .................. 280/784, 280/798, 781; 296/187.03, 187.09, 203.02; 180/232, 312, 311; 188/371, 377; 52/836, 52/837
   See application file for complete search history.

(56) References Cited

U.S. PATENT DOCUMENTS

| 5,464,302 | A | * | 11/1995 | Menchetti ................ 403/335 |
| 5,553,437 | A | * | 9/1996 | Navon ..................... 52/837 |
| 5,715,757 | A | * | 2/1998 | Dannawi et al. ......... 105/392.5 |
| 6,068,330 | A | * | 5/2000 | Kasuga et al. .......... 296/187.09 |
| 6,099,071 | A | * | 8/2000 | Kasuga et al. ............. 296/205 |
| 6,131,632 | A | * | 10/2000 | Fukumoto et al. ........... 152/454 |
| 6,195,953 | B1 | * | 3/2001 | Gitter et al. ................ 52/843 |
| 6,499,798 | B2 | * | 12/2002 | Takemoto .............. 296/203.02 |
| 6,584,689 | B2 | * | 7/2003 | Bruggemann et al. ...... 29/897.2 |
| 6,672,654 | B2 | * | 1/2004 | Yamada et al. .............. 296/205 |
| 6,799,781 | B2 | * | 10/2004 | Rasidescu et al. .......... 280/781 |
| 6,896,317 | B2 | * | 5/2005 | Liebhard et al. ........ 296/187.03 |
| 7,063,376 | B2 | * | 6/2006 | Ori et al. ............... 296/187.01 |
| 7,093,866 | B2 | * | 8/2006 | Toneatti et al. .............. 293/133 |
| 7,213,867 | B2 | * | 5/2007 | Haneda et al. .............. 296/132 |
| 7,300,080 | B2 | * | 11/2007 | Rebuffet et al. ............. 293/120 |
| 7,380,830 | B2 | * | 6/2008 | Mitsui et al. ............... 280/784 |
| 2003/0042763 | A1 | * | 3/2003 | Yamada et al. .............. 296/205 |
| 2003/0107241 | A1 | * | 6/2003 | Ritchie et al. ............... 296/188 |
| 2006/0255603 | A1 | * | 11/2006 | Rebuffet et al. ............. 293/120 |
| 2008/0315626 | A1 | * | 12/2008 | Lutter et al. ........... 296/187.04 |

FOREIGN PATENT DOCUMENTS

| JP | 11-208519 | 8/1999 |
| JP | 2003-072587 | 3/2003 |
| WO | WO2007025791 A1 | * | 3/2007 |

* cited by examiner

*Primary Examiner*—Paul N. Dickson
*Assistant Examiner*—Timothy Wilhelm
(74) *Attorney, Agent, or Firm*—Rankin, Hill & Clark LLP

(57) ABSTRACT

A hollow extruded frame formed by extruding a light alloy. The frame is formed from a peripheral wall part which, in a cross-section perpendicular to a longitudinal direction of the frame, has a short axis and a long axis. A plurality of confluent parts positioned so as to be symmetrical with respect to the short axis is formed on an inner side of the peripheral wall part or on the peripheral wall part. Three wall parts extend radially at equal angles of 120° from the confluent parts.

2 Claims, 11 Drawing Sheets

LIGHT ALLOY EXTRUDED FRAME

FIELD OF THE INVENTION

The present invention relates to a hollow frame having a short axis and a long axis and formed from a light alloy extrusion and, more particularly, to such a light alloy extruded frame having a plurality of reinforcing parts provided inside thereof.

BACKGROUND OF THE INVENTION

Frames in which left and right front side frames are formed by extrusion from light alloy materials such as aluminum alloys or the like are known, for example, from Japanese Patent Application Laid-Open Publication No. 11-208519 (JP 11-208519 A) and Japanese Patent Application Laid-Open Publication No. 2003-72587 (JP 2003-72587 A).

The front side frames disclosed in JP 11-208519 A and JP 2003-72587 A are hollow members in which the cross-sectional shape of the outer frame part is formed as a regular hexagonal shape, and a plurality of radial ribs that connect the respective vertices formed on the peripheral wall with a central shaft are disposed at equal intervals.

In such front side frames, radial ribs are disposed at equal intervals as a result of the peripheral wall being formed in a regular hexagonal shape. Therefore, when an impact occurs in the front part of the vehicle body, this impact can be uniformly supported by the peripheral wall, radial ribs, and the like. Accordingly, the impact energy that is generated is favorably absorbed by the front side frame.

However, since the abovementioned front side frames have a structure in which the peripheral wall is formed in a regular hexagonal shape, and radial ribs are disposed at equal intervals, the respective vertices are positioned on the circumference of the same circle. Accordingly, the width dimension of the front side frames is increased, and restrictions arise in the formation of a space for accommodating the radiator and the like between the left and right front side frames. Consequently, there is a demand for a technique that can ensure the favorable absorption of the impact energy that is generated, even in front side frames having a short axis and a long axis.

SUMMARY OF THE INVENTION

It is an object of the present invention to provide a light alloy extruded frame of the type having a short axis and a long axis, which has good impact energy absorption characteristics, which is imparted with increased rigidity, and which provides a space with a sufficient width dimension for accommodating a radiator.

According to an aspect of the present invention, there is provided a hollow extruded frame formed by extruding a light alloy, which the frame comprising: a peripheral wall part, which, in a cross section perpendicular to a longitudinal direction of the frame, has a short axis and a long axis; and a plurality of confluent or merging parts which are formed on an inner side of the peripheral part or on the peripheral part, or both, and which are positioned so as to be in linear symmetry with respect to the short axis, each of the confluent parts being defined by three wall parts at equal angles.

Since three wall parts extend for equal intervals, i.e., for an angle of 120 degrees, from each confluent part, the impact acting on each confluent part is equally distributed among the respective confluent parts. Accordingly, the impact acting on the extruded frame can be efficiently supported by the respective confluent parts, and the impact energy acting on the extruded frame can be favorably absorbed.

Since the confluent parts are disposed in positions that are symmetrical with respect to the short axis, each of the confluent parts can be disposed inside the peripheral wall part in a well-balanced manner even though the cross-sectional shape of the extruded frame has a short axis and a long axis, and the impact energy acting on the extruded frame is favorably absorbed.

For example, by using this extruded frame in a front side frame, it is possible to ensure the absorption of impact energy by this front side frame, and it is also possible to keep the width dimension of this front side frame to a small value. As a result, the space between the left and right front side frames can be maintained as a large space, and a radiator with a large lateral width can be accommodated in this space.

Preferably, the confluent parts are disposed in a position that is symmetrical to the abovementioned long axis. Accordingly, the confluent parts are provided in a favorable balance in the cross-sectional configuration of the extruded frame, even in the transverse direction thereof.

The confluent parts may be provided along the long axis.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Reference is now made to FIGS. 1 through 6 inclusive, which shows a light alloy extruded frame according to a first embodiment of the present invention.

Figure 1:
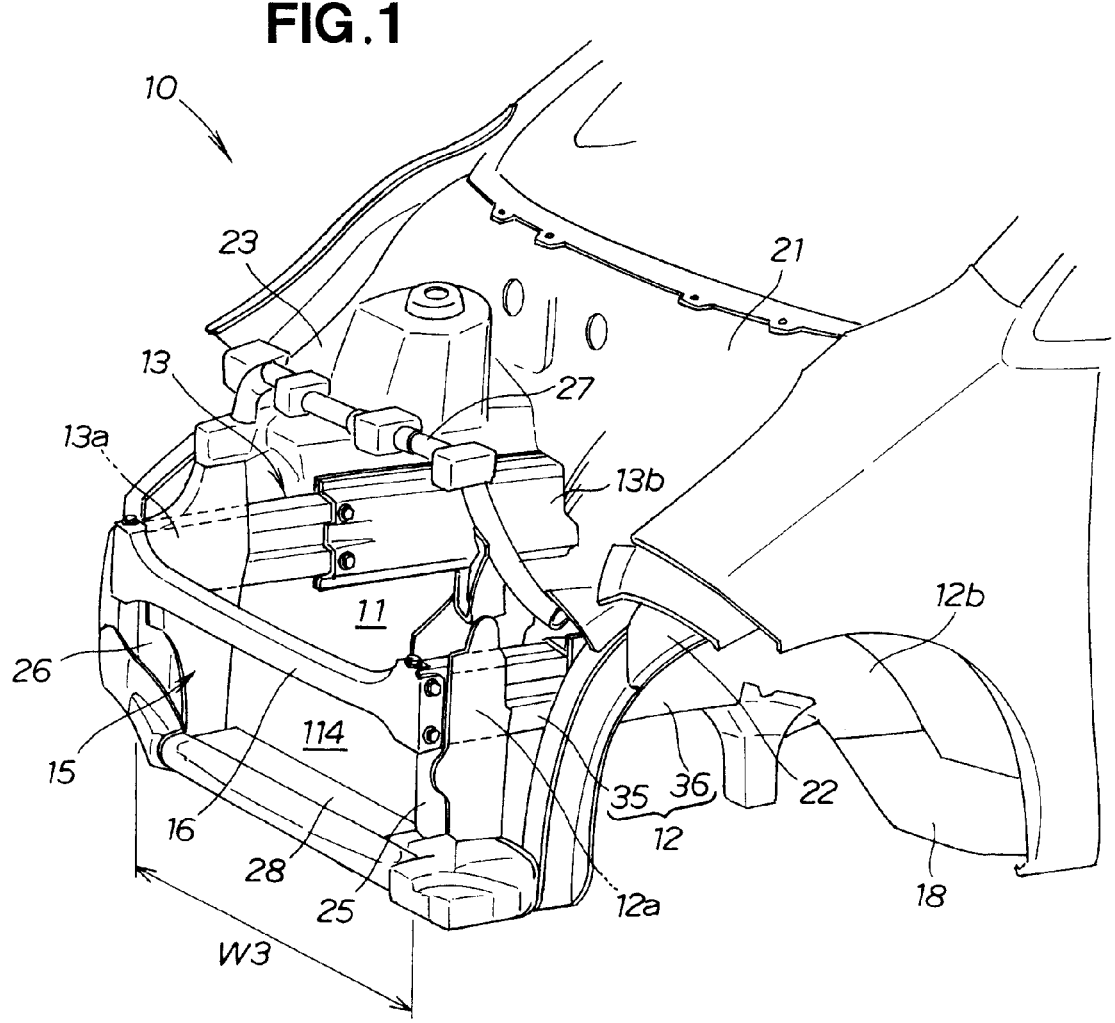
FIG. 1 is a perspective view of a vehicle body frame structure employing a light alloy extruded frame according to a first embodiment of the present invention.

As shown in FIG. 1, the vehicle body frame structure 10 comprises left and right front side frames 12, 13 which form the left and right frame parts of an engine compartment 11, a bulkhead 15 which is disposed on the front end parts 12a, 13a of the left and right front side frames 12, 13, a connecting bar 16 which is disposed between the front end parts 12a, 13a of the left and right front side frames 12, 13, left and right outriggers 18 (the right outrigger is not shown) which extend rearward from the rear end parts 12b, 13b of the left and right front side frame 12, 13, and a firewall 21 which is disposed on the left and right outriggers 18 and the rear end parts 12b, 13b of the left and right front side walls 12, 13.

Furthermore, the vehicle body frame structure 10 further comprises a left upper member 22 which is disposed on the outside of the vehicle body with respect to the left front side frame 12, and a right upper member 23 which is disposed on the outside of the vehicle body with respect to the right front side frame 13.

The bulkhead 15 has a left supporting column 25 which is disposed on the front end part 12a of the left front side frame 12, a right supporting column 26 which is disposed on the front end part 13a of the right front side frame 13, an upper bridge part 27 which connects the upper end parts of the left and right supporting columns 25, 26, and a lower bridge part 28 which connects the lower end parts of the left and right supporting columns 25, 26. The radiator 31 (FIG. 5) is attached to the abovementioned bulkhead 15.

Figure 2:
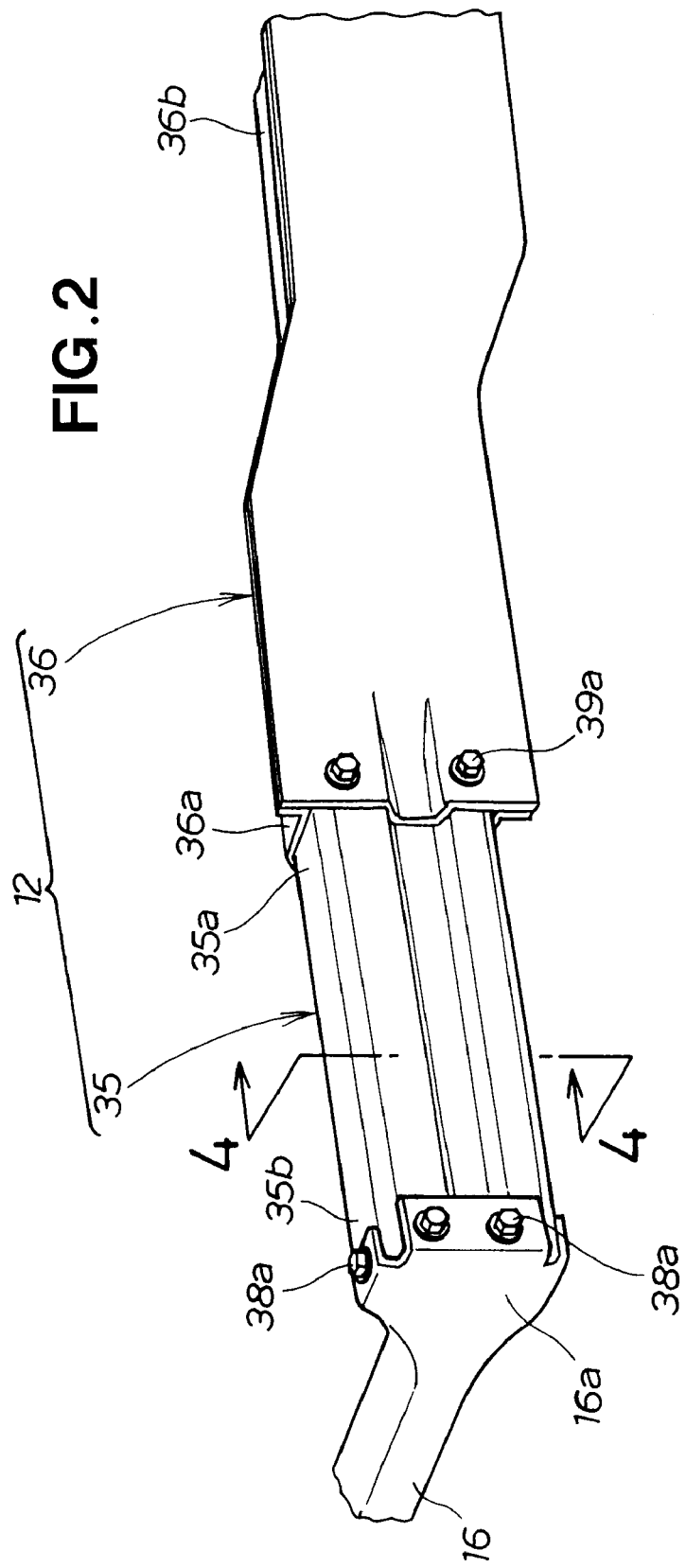
FIG. 2 is a perspective view of a front side frame shown in FIG. 1.
Figure 3:
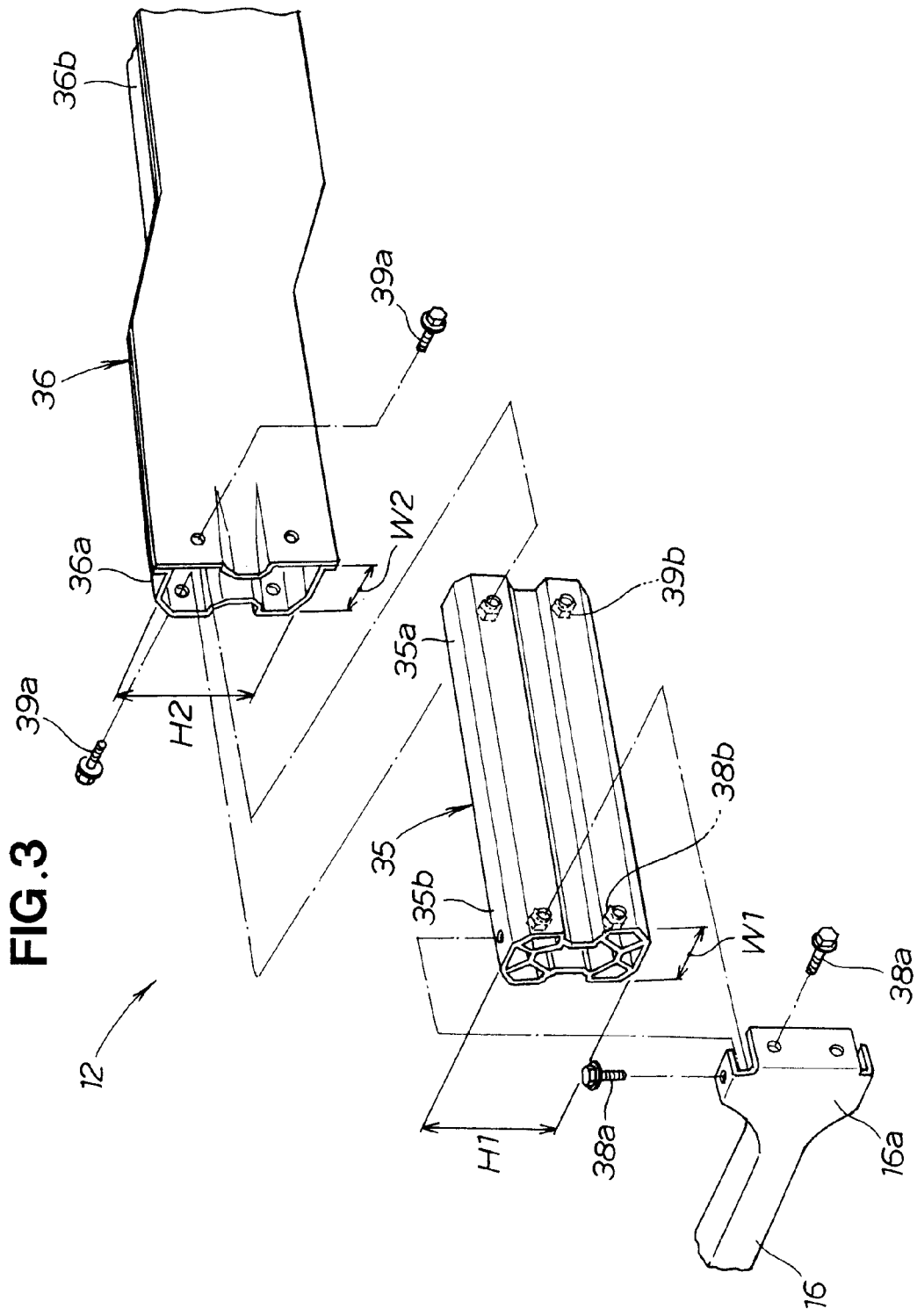
FIG. 3 is an exploded perspective view of the front side frame of FIG. 2.

Referring to FIGS. 2 and 3, the left front side member 12 comprises a light alloy front part side frame (extruded frame) 35 which extends in the forward-rearward direction of the vehicle body, and a rear part side frame 36 which extends toward the rear of the vehicle body from the rear end part 35a of the front part side frame 35.

The front part side frame 35 is a hollow member which is formed by extruding an aluminum alloy which is a light alloy, and which is formed with a long axis dimension H1 and a short axis dimension W1. The short axis dimension W1 is formed so that this dimension is shorter than the long axis dimension H1.

The rear part side frame 36 is a hollow member which is formed from a steel material, and which is formed so that the front end part 36a has a long axis dimension H2 and a short axis dimension W2. The short axis dimension W2 is formed so that this dimension is smaller than the long axis dimension H2.

The long axis dimensions H1 and H2 are in the relationship H1<H2. The short axis dimensions W1 and W2 are in the relationship W1<W2. Specifically, the front part side frame 35 is formed so that the external shape of this frame is considerably smaller than that of the front end part 36a of the rear part side frame 36.

The left end part 16a of the connecting bar 16 is attached to the front end part 35b of the front part side frame 35 by a plurality of bolts 38a and nuts 38b. The rear end part 35a of the front part side frame 35 is attached by a plurality of bolts 39a and nuts 39b in a state in which this rear end part 35a is inserted into the front end part 36a of the rear part side frame 36.

The rear end part 36b is joined to the firewall 21 (FIG. 1) in a state in which the front part side frame 35 is attached to the front end part 36a of the rear part side frame 36.

Figure 4:
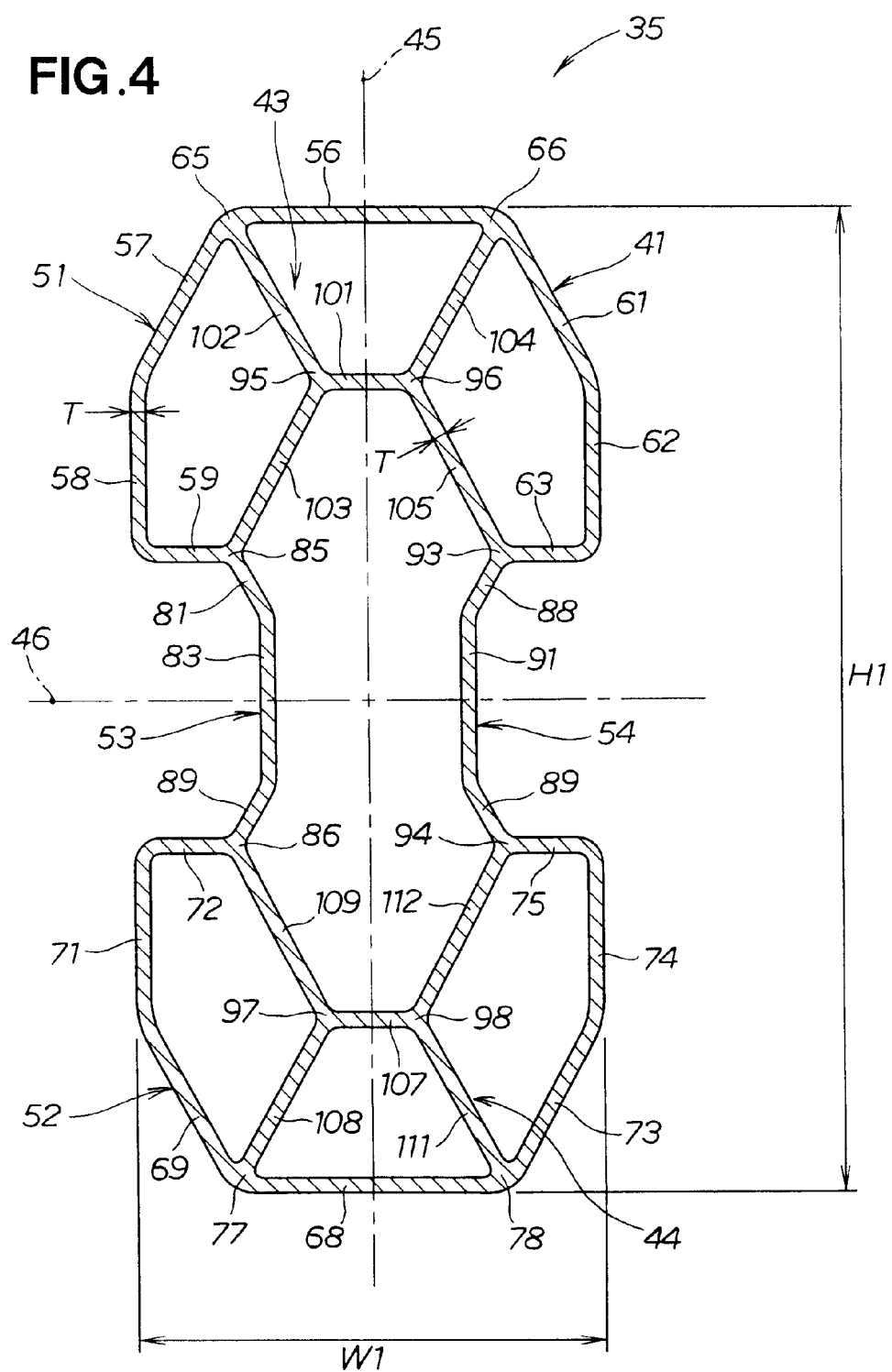
FIG. 4 is an enlarged sectional view taken along line 4-4 of FIG. 2.

Reference is now made to FIG. 4 showing in section the front part side frame 35 shown in FIGS. 2 and 3.

The front part side frame 35 has a peripheral wall 41 which forms an outer frame by extruding a light alloy such as an aluminum alloy or the like, and a reinforcing part 43 that is positioned inside this peripheral wall 41.

For example, A6063-T5 according to JIS standards is used as the aluminum alloy.

For example, the peripheral wall 41 and reinforcing part 43 are formed with a plate thickness T of approximately 1.5 mm.

The front side frame 35 has a short axis 46 and long axis 45 in cross section. For example, the short axis dimension W1 and long axis dimension H1 are designed so that W1×H1 is 75 mm×103 mm.

The peripheral wall 41 comprises an upper side peripheral wall part 51 which is formed with a substantially rectangular shape in cross section, a lower side peripheral wall part 52 which is formed with a substantially rectangular shape in cross section, and left and right connecting wall parts 53 that connect the upper side peripheral wall part 51 and the lower side peripheral wall part 52, and has an iron array shape overall.

The upper side peripheral wall part 51 has an upper side horizontal wall part (wall part) 56, an upper side left inclined wall part (wall part) 57 which is formed on the left end part of the upper side horizontal wall part 56, an upper side left vertical wall part (wall part) 58 which is formed on the lower end part of the upper side left inclined wall part 57, an upper side left horizontal wall part (wall part) 59 which is formed horizontally on the lower end part of the upper side left vertical wall part 58, an upper side right inclined wall part (wall part) 61 which is formed on the right end part of the upper side horizontal wall part 56, an upper side right vertical wall part (wall part) 62 which is formed on the lower end part of the upper side right inclined wall part 61, and an upper side right horizontal wall part (wall part) 63 which is formed horizontally on the lower end part of the upper side right vertical wall part 62.

Here, the angle between the upper side horizontal wall part 56 and the upper side left inclined wall part 57 is 120 degrees, the angle between the upper side left inclined wall part 57 and the upper side left vertical wall part 58 is 150 degrees, and the angle between the upper side left vertical wall part 58 and the upper side left horizontal wall part 59 is 90 degrees.

The angle between the upper side horizontal wall part 56 and the upper side right inclined wall part 61 is 120 degrees, the angle between the upper side right inclined wall part 61 and the upper side right vertical wall part 62 is 150 degrees, and the angle between the upper side right vertical wall part 62 and the upper side right horizontal 63 is 90 degrees.

The upper side peripheral wall part 51 is formed substantially in a U shape by the respective wall parts 56, 57, 58, 59, 61, 62, and 63.

An upper side left apical part 65 is formed by the confluent or merging parts of the upper side horizontal wall part 56 and the upper side left inclined wall part 57. An upper side right apical part 66 is formed by the confluent parts of the upper side horizontal wall part 56 and the upper side right inclined wall part 61.

The lower side peripheral wall part 52 has a lower side horizontal wall part (wall part) 68, a lower side left inclined wall part (wall part) 69 which is formed on the left end part of the lower side horizontal wall part 68, a lower side left vertical wall part (wall part) 71 which is formed on the upper end part of the lower side left inclined wall part 69, a lower side left horizontal wall part (wall part) 72 which is formed horizontally on the upper end part of the lower side left vertical wall part 71, a lower side right inclined wall part (wall part) 73 which is formed on the right end part of the lower side horizontal wall part 68, a lower side right vertical wall part (wall part) 74 which is formed on the upper end part of the lower side right inclined wall part 73, and a lower side right horizontal wall part (wall part) 75 which is formed horizontally on the upper end part of the lower side right vertical wall part 74.

Here, the angle between the lower side horizontal wall part 68 and the lower side left inclined wall part 69 is 120 degrees, the angle between the lower side left inclined wall part 69 and the lower side left vertical wall part 71 is 150 degrees, and the angle between the lower side left vertical wall part 74 and the lower side left horizontal wall part 72 is 90 degrees.

The angle between the lower side horizontal wall part 68 and the lower side right inclined wall part 73 is 120 degrees, the angle between the lower side right inclined wall part 73 and the lower side right vertical wall part 74 is 150 degrees, and the angle between the lower side right vertical wall part 74 and the lower side right horizontal wall part 75 is 90 degrees.

The lower side peripheral wall part 52 is formed in substantially a U shape by the respective wall parts 68, 69, 71, 72, 73, 74, and 75.

A lower side left apical part 77 is formed by the confluent parts of the lower side horizontal wall part 68 and the lower side left inclined wall part 69. A lower side right apical part 78 is formed by the confluent parts of the lower side horizontal wall part 68 and the lower side right inclined wall part 73.

The left connecting wall part 53 has an upper side left inclined connecting wall part (wall part) 81 which extends downward and inward at an inclination from the inside end part of the upper side left horizontal wall part 59, a lower side left inclined connecting wall part (wall part) 82 which extends upward and inward at an inclination from the inside end part of the lower side left horizontal wall part 72, and a left vertical wall part (wall part) 83 which connects the upper side left inclined connecting wall part 81 and the lower side left inclined connecting wall part 82.

Here, the angle between the upper side left inclined connecting wall part 81 and the left vertical connecting wall 83 is 150 degrees, and the angle between the lower side left inclined connecting wall part 82 and the left vertical wall part 83 is also 150 degrees.

An upper side left connecting part 85 is formed in the location where the upper side left horizontal wall part 59 and the upper side left inclined connecting wall part 81 merge with each other. A lower side left connecting part 86 is formed in the location where the lower side left horizontal wall part 72 and the lower side left inclined connecting wall part 82 merge with each other.

The right connecting wall part 54 has an upper side right inclined connecting wall part (wall part) 88 which extends downward and inward at an inclination from the inside end part of the upper side right horizontal wall part 63, a lower side right inclined connecting wall part (wall part) 89 which extends upward and inward at an inclination from the inside end part of the lower side right horizontal wall part 75, and a right vertical wall part (wall part) 91 which connects the upper side right inclined connecting wall part 88 and the lower side right inclined connecting wall part 89.

Here, the angle between the upper side right inclined connecting wall part 88 and right vertical connecting wall 91 is 150 degrees, and the angle between the lower side right inclined connecting wall part 89 and right vertical wall part 91 is also 150 degrees.

An upper side right connecting part 93 is formed in the location where the upper side right horizontal wall part 63 and the upper side right inclined connecting wall part 88 merge with each other. A lower side right connecting part 94 is formed in the location where the lower side right horizontal wall part 75 and the lower side right inclined connecting wall part 89 merge with each other.

The upper side reinforcing part 43 is formed inside the upper side peripheral wall part 51, and has a substantially H-form shape. This part has two confluent parts, i.e., an upper side left confluent part and an upper side right confluent part 96. In other words, the upper side reinforcing part 43 has a rib 101 comprising a horizontal web in the center, and an upper left rib 102, lower left rib 103, upper right rib 104, and lower right rib 105 comprising four flanges.

The upper side left confluent part 95 and the upper side right confluent part 96 are connected by the central rib 101. The upper side left confluent part 95 and the upper side apical part 65 of the upper side peripheral wall part 51 are connected by upper left rib 102. The upper side left confluent part 95 and the upper side left connecting part 85 are connected by the lower left rib 103. The upper side right confluent part 96 and the upper side right apical part 66 of the peripheral wall 41 are connected by the upper right rib 104. The upper side right confluent part 96 and the upper side right connecting part 93 are connected by the lower right rib 105.

The upper side left confluent part 95 is the ground point where three ribs, i.e., the horizontal central rib 101, upper left rib 102, and lower left rib 103, merge with each other to form equal angles; i.e., angles of 120 degrees. Similarly, the upper side right confluent part 96 is the ground point where three ribs, i.e. the horizontal central rib 101, upper right rib 104, and lower right rib 105, merge with each other to form angles of 120 degrees each.

Thus, since the three ribs 101, 102, and 103 extend radially at equal intervals from the upper side left confluent part 95 at angles of 120 degrees, the impact force acting on the upper side left confluent part 95 is distributed equally among the respective ribs.

In the upper side left confluent part 95, the confluent position of the central rib 101 and the upper left rib 102, the confluent position of the upper left rib 102 and the lower left rib 103, and the confluent position lower left rib 103 and central rib 101 are respectively formed in a bent shape at a radius of R. Accordingly, a large cross-sectional area is maintained in the upper side left confluent part 95, the rigidity is increased, and buckling in an early stage can be prevented. Consequently, deformation following buckling is stabilized.

In the upper side right confluent part 96, three reinforcing ribs, i.e., the central rib 101, upper right rib 104, and lower right rib 105, extend radially at equal intervals from the upper side right confluent part 96 at angles of 120 degrees. As a result, the impact force acting on the upper side right confluent part 96 is equally distributed among the respective ribs. Accordingly, the impact force can be efficiently supported by the upper side right confluent part 96.

In the upper side right confluent part 96, as in the upper side left confluent part 95, the positions where adjacent reinforcing ribs merge with each other in the three reinforcing ribs 101, 105 and 104 are respectively formed into bent shapes at a radius of R. Accordingly, the cross-sectional area of the upper side right confluent part 96 is maintained at a large value, and the rigidity is increased.

The upper side left connecting part (hereafter referred to as the upper side left connecting confluent part) 85 and the upper side right connecting part (hereafter referred to as the upper side right connecting confluent part) 93 also have the same structure and effect as the upper side left confluent part 95 and the upper side right confluent part 96.

Specifically, since the upper side left horizontal wall part 59, upper side left inclined connecting wall part 81, and lower left rib 103 extend radially at equal intervals from the upper side connecting confluent part 85 at angles of 120 degrees, the impact force acting on the upper side left connecting confluent part 85 is equally distributed among the respective wall parts 59 and 81, and rib 103.

Since the confluent positions of the respective wall parts 59 and 81 and rib 103 are respectively formed in a bent shape at a radius of R, the cross-sectional area of the upper side left connecting confluent part 85 is maintained at a large value, and the rigidity is increased.

The upper side right connecting confluent part 93 is similar to the upper side left connecting confluent part 85.

Since the upper left rib 102 is connected to the upper side left apical part 65, the system is designed so that the angle of the upper left rib 102 and the upper side left inclined wall part 57, and the angle of the upper left rib 102 and the upper side horizontal wall part 56, are both 60 degrees.

In the upper side left apical part 65, the position where the upper left rib 102 and the upper side left inclined wall part 57 merge with each other, and the position where the upper left rib 102 and the upper side horizontal wall part 56 merge with each other, are both formed in a bent shape at a radius of R. Accordingly, the cross-sectional area of the upper side left apical part 65 is maintained at a large value, and the rigidity is increased.

Since the upper right rib 104 is connected to the upper side right apical part 66, the system is designed so that the angle of the upper right rib 104 and the upper side right inclined wall part 61, and the angle of the upper right rib 104 and the upper side horizontal wall part 56, are both 60 degrees.

In the upper side right apical part 66, the position where the upper right rib 104 and the upper side right inclined wall part 61 merge with each other, and the position where the upper right rib 104 and the upper side horizontal wall part 56 merge with each other, are both formed in a bent shape at a radius of R. Thus, the cross-sectional area of the upper side right apical part 66 is maintained at a large value, and the rigidity is increased.

The lower side reinforcing part 44 is formed inside the lower side peripheral wall part 52, and has a substantially H-form shape like that of the upper side reinforcing part 43. This part has two confluent parts, i.e., a lower side left confluent part 97 and a lower side right confluent part 98. Specifically, the lower side reinforcing part 44 has a rib 107 comprising a horizontal web in the center, and a lower left rib 108, upper left rib 109, lower right rib 11, and upper right rib 112 comprising four flanges.

The lower side left confluent part 97 and the lower side right confluent part 98 are connected by the central rib 107. The lower side left confluent part 97 and the lower side left apical part 77 of the lower side peripheral wall part 52 are connected by the lower left rib 108. The lower side [left] confluent part 97 and the lower side left connecting part 86 are connected by the upper left rib 109. The lower side right confluent part 98 and the lower side right apical part 78 are connected by the lower right rib 111. The lower side right confluent part 98 and the lower side right connecting part 94 are connected by the upper right rib 112.

The lower side left confluent part 97 is a ground point where three ribs, i.e., the horizontal central rib 107, lower left rib 108, and upper left rib 109, merge with each other to form equal angles, in concrete terms, angles of 120 degrees. Similarly, the lower side right confluent part 98 is a ground point where three ribs, i.e., the central rib 101, lower right rib 111, and upper right rib 112 merge with each other to form respective angles of 120 degrees.

Thus, since the three ribs 107, 108, and 109 extend radially at equal intervals from the lower side confluent part 97 at angles of 120 degrees, the impact force acting on the lower side left confluent part 97 is equally distributed among the respective ribs. Accordingly, the impact force can be efficiently supported by the lower side left confluent part 97.

In the lower side left confluent part 97, the confluent position of the central rib 107 and the lower left rib 108, the confluent position of the lower left rib 108 and the upper left rib 109, and the confluent position of the upper left rib 109 and central rib 107 are respectively formed in a bent shape at a radius of R. Accordingly, the cross-sectional area of the lower side left confluent part 97 is maintained at a large value, the rigidity is increased, and buckling in early stages is prevented. Accordingly, deformation following buckling is stabilized.

Since the three ribs 107, 111, and 112 extend radially from the lower side right confluent part 98 at angles of 120 degrees, the impact force acting on the lower side right confluent part 98 is equally distributed among the respective ribs. Accordingly, the impact force can be efficiently supported by the lower side right confluent part 98.

In the lower side right confluent part 98, as in the lower side left confluent part 97, the positions where adjacent ribs merge with each other among the three ribs 107, 11, and 112 are respectively formed in a bent shape at a radius of R. Accordingly, the cross-sectional area of the lower side right confluent part 98 is maintained at a large value, and the rigidity is increased.

The lower side left connecting part (hereafter referred to as the lower side left connecting confluent part) 86 and the lower side right connecting part (hereafter referred to as the lower side right connecting confluent part) 94 have the same structure and effect as the lower side left confluent part 97 and the lower side right confluent part 98.

Specifically, since the lower side left horizontal wall part 72, the lower side left inclined connecting wall part 82, and the upper left rib 109 extend radially at equal intervals from the lower side left connecting confluent part 86 at angles of 120 degrees, the impact force acting on the lower side left connecting confluent part 86 is equally distributed among the respective wall part 72 and 82 and rib 109.

Since the confluent part of the respective wall parts 72 and 82 and rib 109 are respectively formed in a bent shape at a radius of R, the cross-sectional area of the lower side left connecting confluent part 86 is maintained at a large value, and the rigidity is increased.

The lower side right connecting confluent part 94 is the same as the lower side left connecting confluent part 86.

Since the lower left rib 108 is connected to the lower side left apical part 77, the system is designed so that the angle of the lower left rib 108 and the lower side left inclined wall part 69, and the angle of the lower left rib 108 and the lower side horizontal wall part 68, are both 60 degrees.

In the lower side left apical part 77, the position where the lower left rib 108 and the lower side left inclined wall part 69 merge with each other, and the position where the lower left rib 108 and the lower side horizontal wall part 68 merge with each other, are both formed in a bent shape at a radius of R. Accordingly, the cross-sectional area of the lower side left apical part 77 is maintained at a large value, and the rigidity is increased.

Since the lower right rib 111 is connected to the lower side right apical part 78, the system is designed so that the angle of the lower right rib 111 and the lower side right inclined wall part 73, and the angle of the lower right rib 111 and the lower side horizontal wall part 68 are both 60 degrees.

In the lower side right apical part 78, the position where the lower right rib 111 and the lower side right inclined wall part 73 merge with each other, and the position where the lower right rib 111 and the lower side horizontal wall part 68 merge with each other, are both formed in a bent shape at a radius of R. Thus, the cross-sectional area of the lower side right apical part 78 is maintained at a large value, and the rigidity is increased.

As was described above, the various parts on the side of the lower side peripheral wall part 52 are positioned so that these parts have shapes that are respectively symmetrical with the various parts on the side of the upper side peripheral wall part 51, centered on the short axis 46. Accordingly, the lower side reinforcing part 44, left and right connecting confluent parts 86 and 94, left and right apical parts 77 and 78, and the like on the side of the lower side peripheral wall part 52 have the same effects as the respective parts on the side of the upper side peripheral wall part 51.

As a result, the impact acting on the front end part 35b of the front part side frame 35 is efficiently supported by the respective confluent parts 95, 96, 97, 98, the left connecting confluent parts 85, 86, and the right connecting confluent parts 93, 94.

Even though the front part side frame 35 is formed with a shape having a short axis dimension of W1 and a long axis dimension of H1, the respective confluent parts can 95, 96, 97, 98 be installed with a good balance inside the peripheral wall part 41, and the respective connecting confluent parts 85, 85, 93, 93 can be installed with a good balance on the peripheral wall 41. As a result, the absorption of the impact energy acting on the front part side frame 35 can be ensured.

Figure 5:
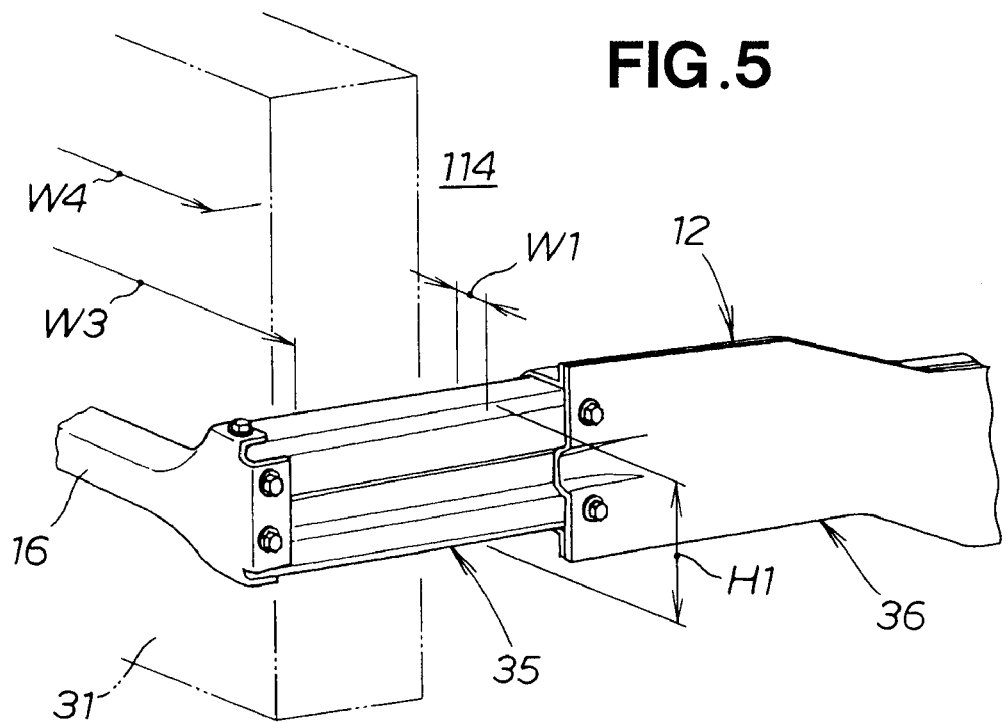
FIG. 5 is schematic view showing a state in which a radiator is attached between the left and right front frames using the extruded frame according to the first embodiment.

FIG. 5 shows a state in which a radiator is attached between left and right front frames using the extruded frame of the first embodiment.

Since the front part side frame 35 has a short axis dimension of W1 and a long axis dimension of H1, a large accommodating space W3 can be maintained between the left and right front frames 12, 13 (for the right front frame, see FIG. 1). The radiator 31 is accommodated in this radiator accommodating space 114. Since the accommodating space W3 can be maintained at a large value, the width dimension W4 of the radiator 31 can be set at a large value.

Figure 6:
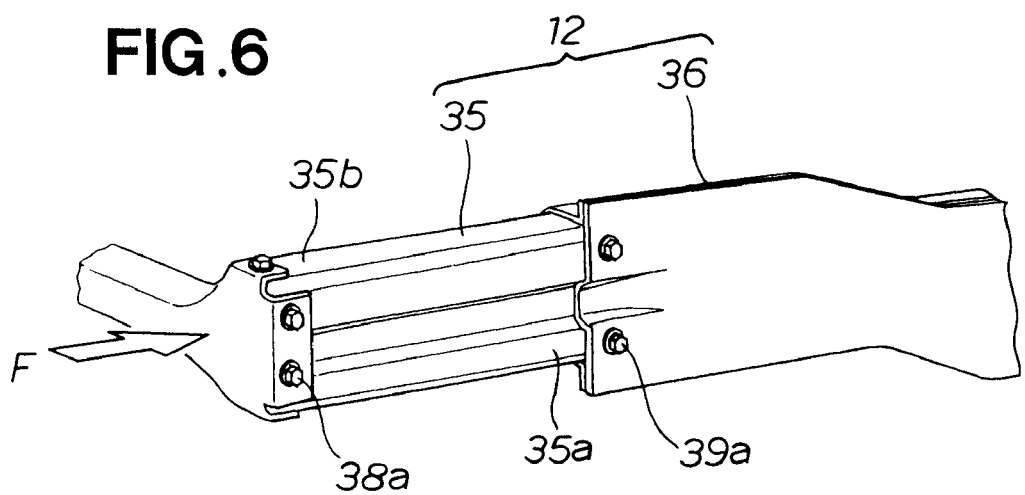
FIG. 6 is a schematic view showing an example in which an impact has acted on the left front frame of FIG. 5.

FIG. 6 shows an example in which an impact acts on the left front frame using the extruded frame shown in FIG. 5.

When an impact F acts on the front end part 35b of the front part side frame 35, this impact F acts on the respective confluent parts 95, 96, 97, 98 (FIG. 4) and on the respective connecting confluent parts 85, 86, 93, 94, and the like shown in FIG. 4. As a result, the impact energy generated by the impact F is favorably absorbed by front part side frame 35.

Figure 7:
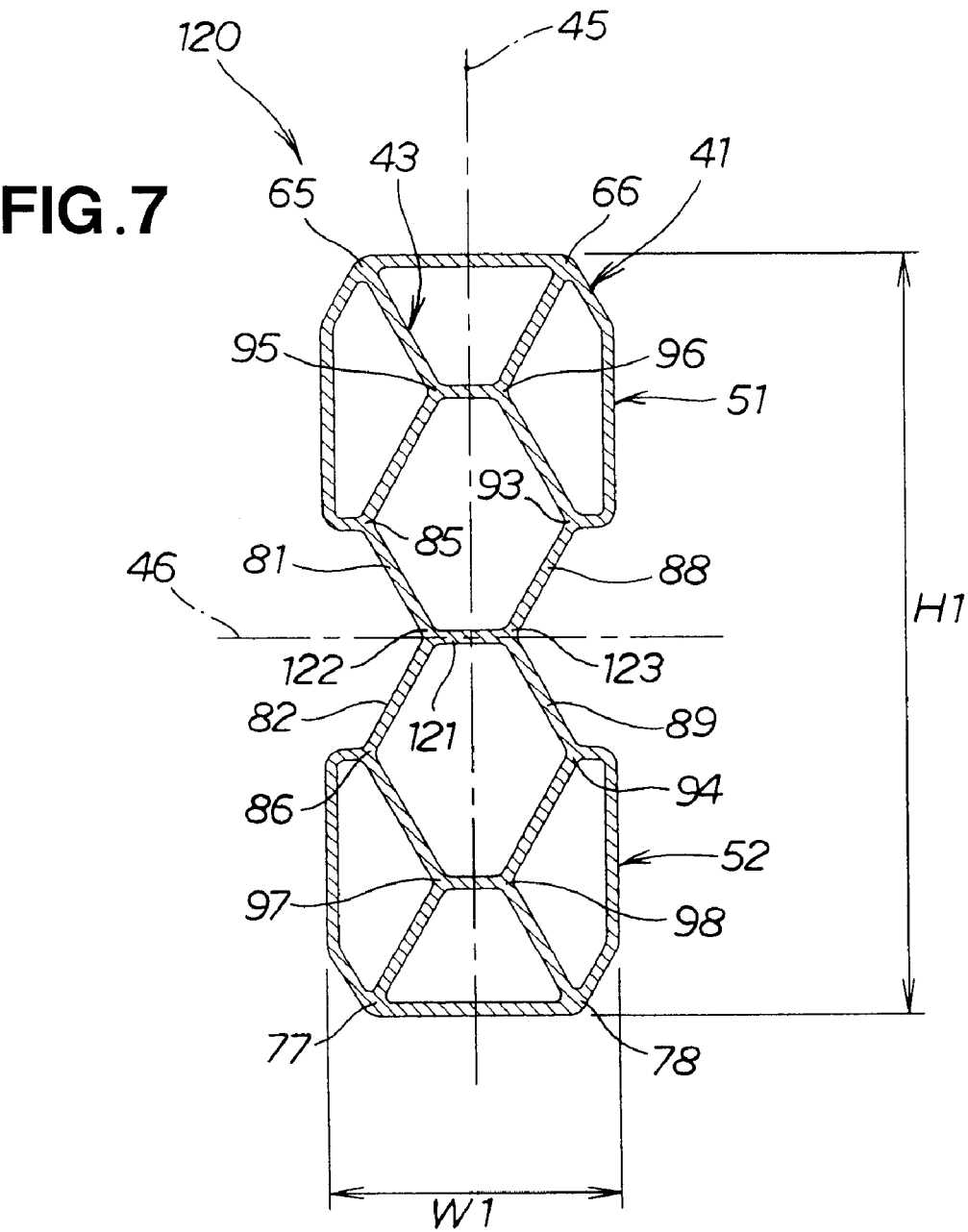
FIG. 7 is a sectional view showing an extruded frame according to a second embodiment of the present invention.

FIG. 7 shows the extruded frame of the second embodiment.

In the front part side frame 120 of the second embodiment, a central horizontal rib (reinforcing part) 121 is disposed on the short axis 46 which is the center in the vertical direction of the of the front part side frame 35 of the first embodiment. Accordingly, left and right central confluent parts 122, 123 are formed. Specifically, the left and right central confluent parts 122,123 are connected by the central horizontal rib 121.

Three wall parts, i.e., an upper side left inclined connecting wall part 81, a lower side left inclined connecting wall part 82, and a central horizontal rib 121, extend radially at equal intervals from the left central confluent part 122 at angles of 120 degrees. Accordingly, the impact force acting on the left central confluent part 122 is equally distributed among the respective wall parts 81 and 82 and rib 121.

In the left central confluent part 122, the position where the upper side left inclined connecting wall part 81 and the lower side left inclined connecting wall part 82 merge with each other, the position where the lower side left inclined connecting wall part 82 and central horizontal rib 121 merge with each other, and the position where the central horizontal rib 121 and the upper side left inclined connecting wall part 81 merge with each other, are respectively formed in a bent shape at a radius of R. Accordingly, the cross-sectional are of the left central confluent part 122 is maintained at a large value, and the rigidity is increased.

The right central confluent part 123 has a shape that shows right-left symmetry with the left central confluent part 122, and has the same effect as the left central confluent part 122. Accordingly, a description of this part is omitted.

In the front part side frame 120 of the second embodiment, a central horizontal rib 121 is provided, and left and right central confluent parts 122 and 123 are provided, so that the absorption of impact energy by the front part side frame 120 can be greatly improved while maintaining the long axis dimension H1 at the same value as in the first embodiment.

Figure 8:
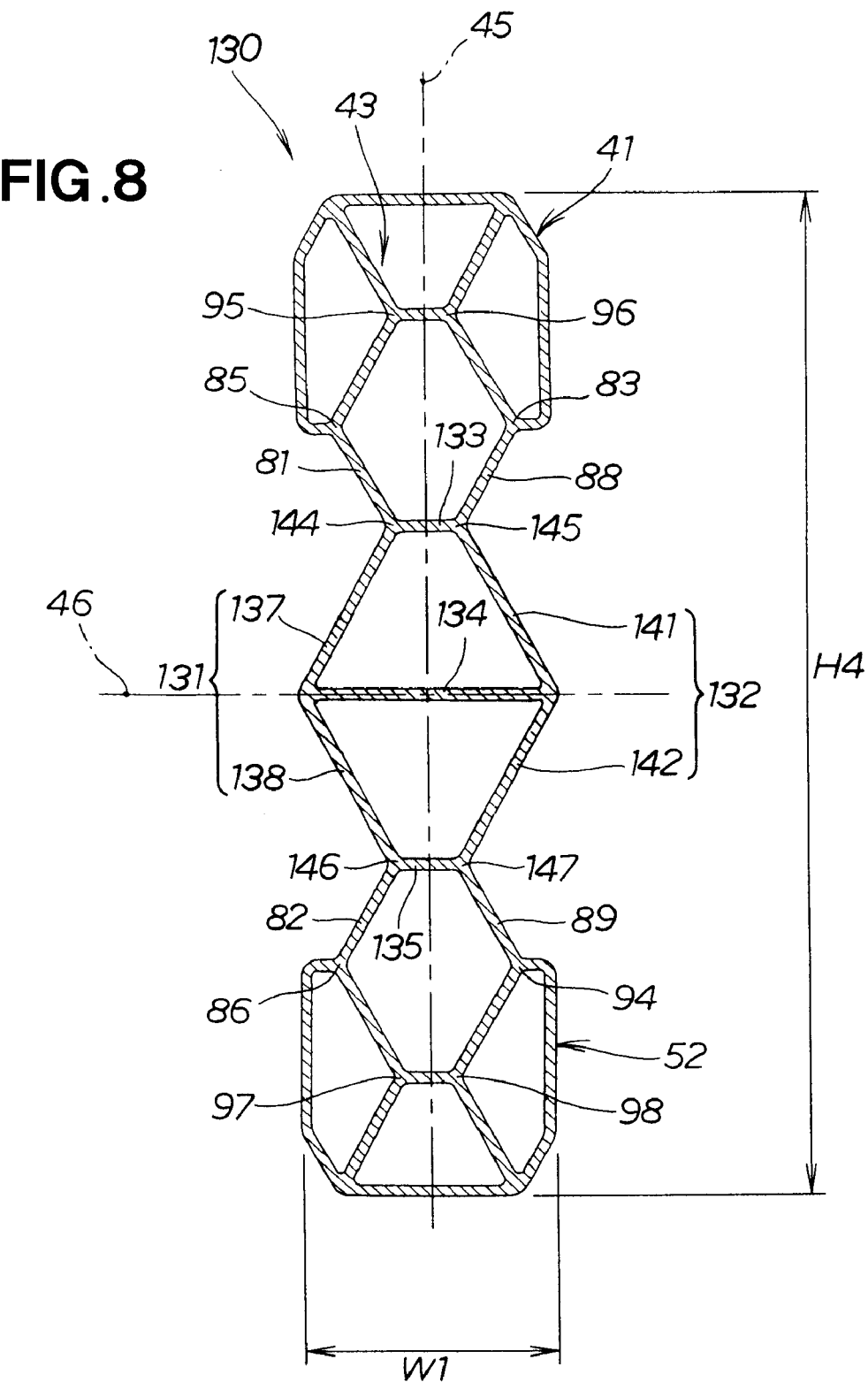
FIG. 8 is a sectional view showing an extruded frame according to a third embodiment of the present invention.

FIG. 8 shows the extruded frame of the third embodiment.

In the front part side member 130 of the third embodiment, left and right dogleg-form wall parts (wall parts) 131, 132 are provided in the center with respect to the vertical direction of the front part side frame 35 of the first embodiment, and are connected by first, second and third horizontal ribs (reinforcing parts) 133, 134, 135.

The left dogleg-form wall part 131 is formed into substantially a dogleg shape by upper and lower left wall parts 137, 138.

The right dogleg-form wall part 132 is formed into substantially a dogleg shape by upper and lower right wall parts 141, 142.

Since the upper side left inclined connecting wall part 81, upper side left wall part 137, and first horizontal rib 133 extend radially from the upper side left confluent part 144 at equal intervals of 120 degrees, the impact force acting on the upper side left confluent part 144 is equally distributed among the respective wall parts 81 and 137, and rib 133.

In the upper side left confluent part 144, the position where the upper side left inclined connecting wall part 81 and the upper side left wall part 137 merge with each other, the position where the upper side left wall part 137 and first horizontal rib 133 merge with each other, and the position where the first horizontal rib 133 and the upper side left inclined connecting wall part 81 merge with each other are respectively formed into a bent shape at a radius of R. Accordingly, the cross-sectional area of the upper side left confluent part 144 is maintained at a large value, and the rigidity is increased.

The upper side right confluent part 145 is formed by causing the upper side right inclined connecting wall part 88, upper side right wall part 141, and first horizontal rib 133 to merge with each other at equal intervals of 120 degrees.

The upper side right confluent part 145 has a shape that shows left-right symmetry with the upper side left confluent part 144, and has the same effect. Accordingly, a description of this part is omitted.

Since the lower side left inclined connecting wall part 82, lower side left wall part 138, and third horizontal rib 135 extend radially at equal intervals of 120 degrees from the lower side left confluent part 146, the impact force acting on the lower side left confluent part 146 is equally distributed among the respective wall parts 82 and 138 and rib 135.

In the lower side left confluent part 146, the position where the lower side left inclined connecting wall part 82 and third horizontal rib 135 merge with each other, the position where the third horizontal rib 135 and the lower side left wall part 138 merge with each other, and the position where the lower side left wall part 138 and the lower side left inclined connecting wall part 82 merge with each other are respectively formed into a bent shape at a radius of R. Accordingly, the cross-sectional area of the lower side left confluent part 146 is maintained at a large value, and the rigidity is increased.

The lower side right confluent part 147 is formed by causing the lower side right inclined connecting wall part 89, lower side right wall part 142, and third horizontal rib 135 to merge with each other at equal intervals of 120 degrees.

The lower side right confluent part 147 has a shape that shows left-right symmetry with the lower side left confluent part 146, and has the same effect. Accordingly, a description of this part is omitted.

The upper side left and right confluent parts 144, 145 and the lower side left and right confluent parts 146, 147 are in symmetrical positions with respect to the short axis 46, i.e., the second horizontal rib 134.

In the front part side frame 130 of the third embodiment, left and right dogleg-form wall parts 131, 132 are disposed in the center with respect to the vertical direction, and first through third horizontal ribs 133, 134, 135 are provided. Accordingly, the long axis dimension H4 can be made larger than the long axis dimension H1 in the first embodiment, and the absorption of the impact energy can be made even larger.

Figure 9:
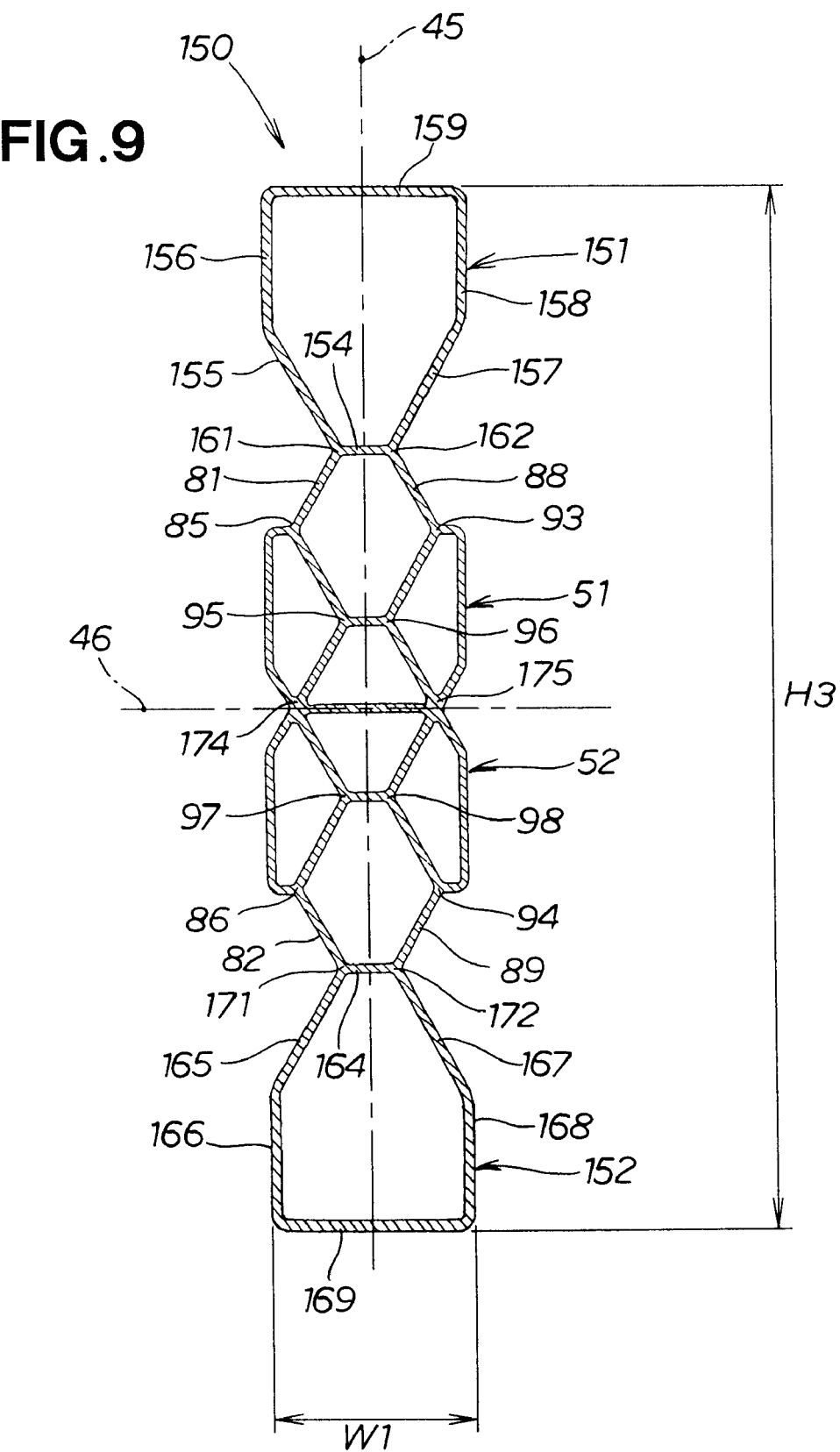
FIG. 9 is a sectional view showing an extruded frame according to a fourth embodiment of the present invention.

FIG. 9 shows the extruded frame of the fourth embodiment.

In the front part side frame 150 of the fourth embodiment, the upper and lower side peripheral wall parts 51, 52 of the first embodiment are installed in the central portion so as to be symmetrical with respect to the short axis 46 in the vertical direction, and a shape is formed in which the respective confluent parts 95, 96, 97, 98 are positioned further toward the short axis 46.

The front part side frame 150 further has an upper side hexagonal peripheral wall part 151 which is disposed on the upper side left inclined connecting wall part 81 and the upper side right inclined connecting wall part 88, and a lower side hexagonal peripheral wall part 152 which is disposed on the lower side left inclined connecting wall part 82 and the lower side right inclined connecting wall part 89.

The upper side hexagonal peripheral wall part 151 has a horizontal upper side first wall part 154 which connects the upper side left inclined connecting wall part 81 and upper side right inclined connecting wall part 88, an upper side second wall part 155 which is formed on the left end part of the upper side first wall part 154, an upper side third wall part 156 which is formed on the upper end part of the upper side second wall part 155, an upper side fourth wall part 157 which is formed on the right end part of the upper side first wall part 154, an upper side fifth wall part 158 which is formed on the upper end part of the upper side fourth wall part 157, and a horizontal upper side sixth wall part 159 which connects the upper side third wall part 156 and upper side fifth wall part 158.

The upper side left hexagonal confluent part 161 is formed by causing the upper side left inclined connecting wall part 81, upper side first wall part 154, and upper side second wall part 155 to merge with each other.

Since three wall parts, i.e., the upper side left inclined connecting wall part 81, upper side first wall part 154, and upper side second wall part 155, extend radially from the upper side hexagonal confluent part 161 at equal intervals of 120 degrees, the impact force acting on the upper side left hexagonal confluent part 161 is equally distributed among the respective wall parts 81, 154, and 155.

In the upper side left hexagonal confluent part 161, the position where the upper side left inclined connecting wall part 81 and the upper side first wall part 154 merge with each other, the position where the upper side first wall part 154 and the upper side second wall part 155 merge with each other, and the position where the upper side second wall part 155 and the upper side left inclined connecting wall part 81 merge with each other are respectively formed in a bent shape at a radius of R. Accordingly, the cross-sectional area of the upper side hexagonal confluent part 161 is maintained at a large value, so that the rigidity of the front part side frame 150 is increased. Consequently, early buckling of the front part side frame 150 is favorably prevented, and deformation following buckling is stabilized.

The upper side right hexagonal confluent part 162 is formed by causing the upper side right inclined connecting wall part 88, upper side first wall part 124, and upper side fourth wall part 157 to merge with each other.

This upper side right hexagonal confluent part 162 has a shape that shows left-right symmetry with the abovementioned upper side left hexagonal confluent part 161 with respect to the long axis 45. Accordingly, a description of this part is omitted.

The lower side hexagonal peripheral wall part 152 has a horizontal lower side first wall part 164 which connects the lower side left inclined connecting wall part 82 and the lower side right inclined connecting wall part 89, a lower side second wall part 165 which is formed on the left end part of the lower side first wall part 164, a lower side third wall part 136 which is formed on the lower end part of the lower side second wall part 165, a lower side fourth wall part 167 which is formed on the right end part of the lower side first wall part 164, a lower side fifth wall part 168 which is formed on the lower end part of the lower side fourth wall part 167, and a horizontal lower side sixth wall part 169 which connects the lower side third wall part 166 and the lower side fifth wall part 168.

The lower side left hexagonal confluent part 171 is formed by causing the lower side left inclined connecting wall part 82, lower side first wall part 164, and lower side second wall part 165 to merge with each other.

Since three wall parts, i.e., the lower side left inclined connecting wall part 82, lower side first wall part 164, and lower side second wall part 165. extend radially from the lower side hexagonal confluent part 171 at equal intervals of 120 degrees, the impact force acting on the lower side left hexagonal confluent part 171 is equally distributed among the respective wall parts 82, 164, and 165.

In the lower side hexagonal confluent part 171, the position where the lower side left inclined connecting wall part 82 and the lower side first wall part 164 merge with each other, the position where the lower side first wall part 164 and the lower side second wall part 165 merge with each other, and the position where the lower side second wall part 165 and the lower side left inclined connecting wall part 82 merge with each other are respectively formed in a bent shape at a radius of R. Accordingly, the cross-sectional area of the lower side left hexagonal confluent part 171 is maintained at a large value, and the rigidity is increased.

The lower side right hexagonal confluent part 171 is formed by causing the lower side right inclined connecting wall part 89, lower side first wall part 164, and lower side fourth wall part 167 to merge with each other.

This lower side right hexagonal confluent part 172 has a shape that shows left-right symmetry with the lower side left hexagonal confluent part 171 with respect to the long axis 45. Accordingly, a description of this part will be omitted.

The left and right upper side confluent parts 161, 162 and the left and right lower side hexagonal confluent parts 171, 172 are symmetrical with respect to the short axis 46. Accordingly, in the front part side frame 150, even if the long axis dimension H3 is large than the short axis dimension W1, the respective confluent parts 95, 96, 97, 98 are disposed with a good balance inside the peripheral wall part 41, and the respective connecting confluent parts 85, 86, 93, 94 and the respective hexagonal confluent parts 161.162, 171, 172 are disposed with a good balance on the peripheral wall part 41. Accordingly, even if the long axis dimension H3 is set at a larger value than the long axis dimension H1 in the first embodiment with respect to the short axis dimension W1, the impact energy acting on the front part side frame 150 is reliably absorbed.

In the front part side frame 150 of the second embodiment, since the upper and lower peripheral wall parts 51, 52 are disposed in the central portion centered on the short axis 46, left and right central confluent parts 174, 175 can be formed. Accordingly, the absorption of impact energy by the front part side frame 150 is greatly increased.

Figure 10:
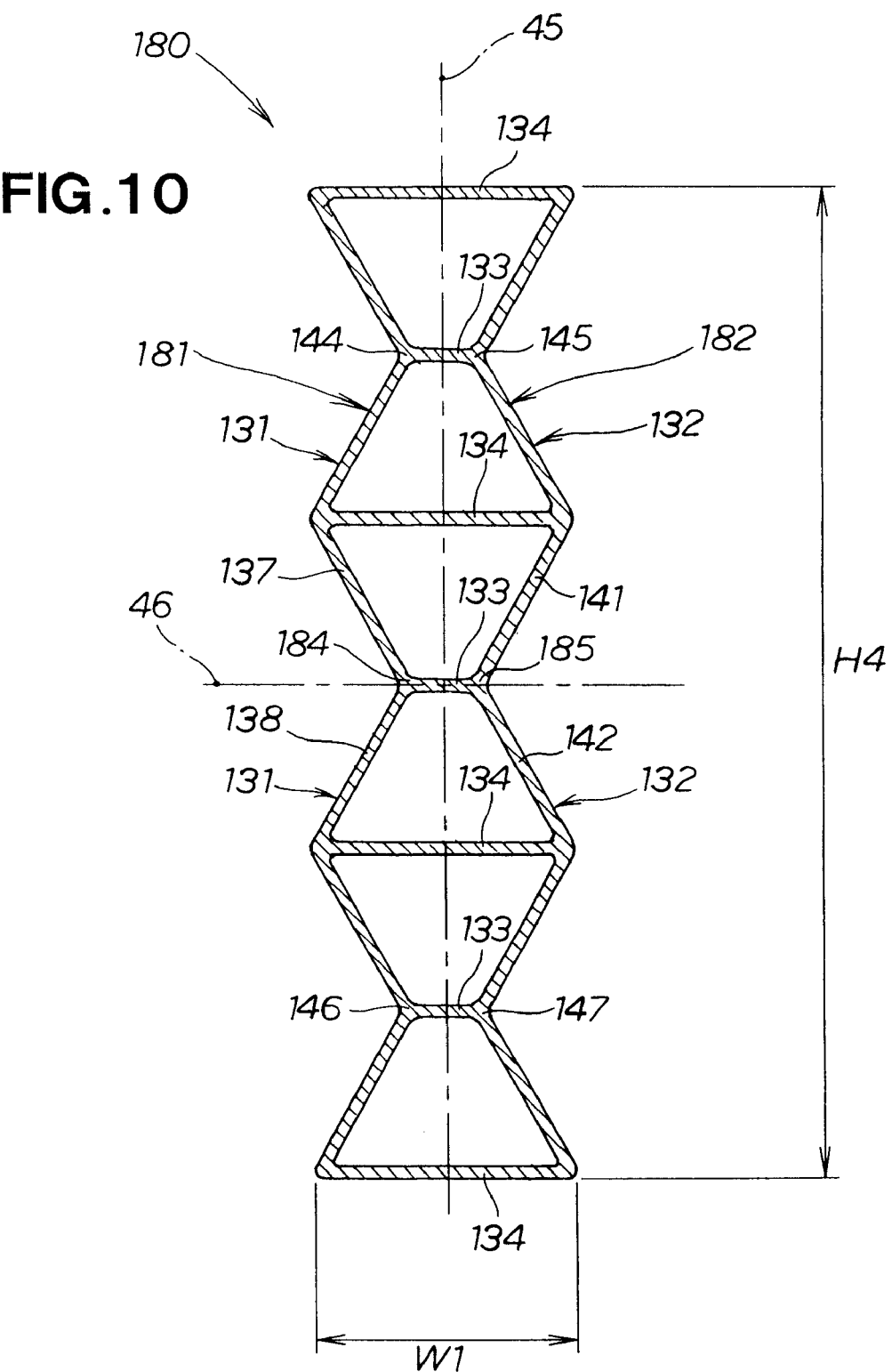
FIG. 10 is a sectional view showing an extruding frame according to a fifth embodiment of the present invention.

FIG. 10 shows the extruded frame of the fifth embodiment.

The front part side frame 180 of the fifth embodiment has a shape in which a plurality of the left and right dogleg-form wall parts 131, 132 of the third embodiment shown in FIG. 8 are combined in the vertical direction, and a plurality of first horizontal ribs 133 and a plurality of second horizontal [ribs] 134 are combined.

As a result of a plurality of left dogleg-form wall parts 131 being combined, a left wave-form wall part (wall part) 181 is formed by the upper and lower side left wall parts 137, 138.

As a result of a plurality of right dogleg-form wall parts 132 being combined, a right wave-form wall part (wall part) 182 is formed by the upper and lower side right wall parts 141, 142.

A plurality of first horizontal rib parts 133 and a plurality of second horizontal rib parts 134 are connected between the left wave-form wall part 181 and right wave-form wall part 182.

The left and right wave-form parts 181, 182 constituting the front part side frame 180 have six confluent parts, i.e., an upper side left confluent part 144, upper side right confluent part 145, lower side left confluent part 146, lower side right confluent part 147, left central confluent part 184, and right central confluent part 185. Specifically, the abovementioned plurality of confluent parts is formed not inside the peripheral wall part, but rather on the peripheral wall part itself.

The upper side left wall part 137, lower side left wall part 138, and first horizontal rib 133 in the central portion with respect to the vertical direction extend radially at equal intervals of 120 degrees from the left central confluent part 184. Accordingly, the impact force acting on the left central confluent part 184 is equally distributed among the respective wall parts 137, 138 and rib 133.

In the left central confluent part 184, the position where the upper side left wall part 137 and the lower side left wall part 138 merge with each other, the position where the lower side left wall part 138 and central first horizontal rib 133 merge with each other, and the position where the central first horizontal rib 133 and the upper side left wall part 137 merge with each other are respectively formed into a bent shape at a radius of R. Accordingly, the cross-sectional area of the left central confluent part 184 is maintained at a large value, and the rigidity is increased. Buckling of the front part side frame 180 in an early stage is favorable prevented, and deformation following buckling is stabilized.

The right central confluent part 185 has a shape that shows left-right symmetry with the left central confluent part 184 with respect to the long axis 45. Accordingly, a description of this part is omitted.

In the front part side frame 180 of the fifth embodiment, the number of confluent parts can be made lower than the eight confluent parts of the front part side frame 130 of the third embodiment. Accordingly, in regard to the absorption of impact energy, such energy can be suppressed to a lower value that in the front part side frame 130 of the third embodiment while maintaining the long axis dimension H4 and short axis dimension W1 of the front part side frame 180 at the same dimensions as those of the front part side frame 130 of the third embodiment. Consequently, front part side frames with different impact energy absorption values can be used in accordance with the application involved.

Figure 11:
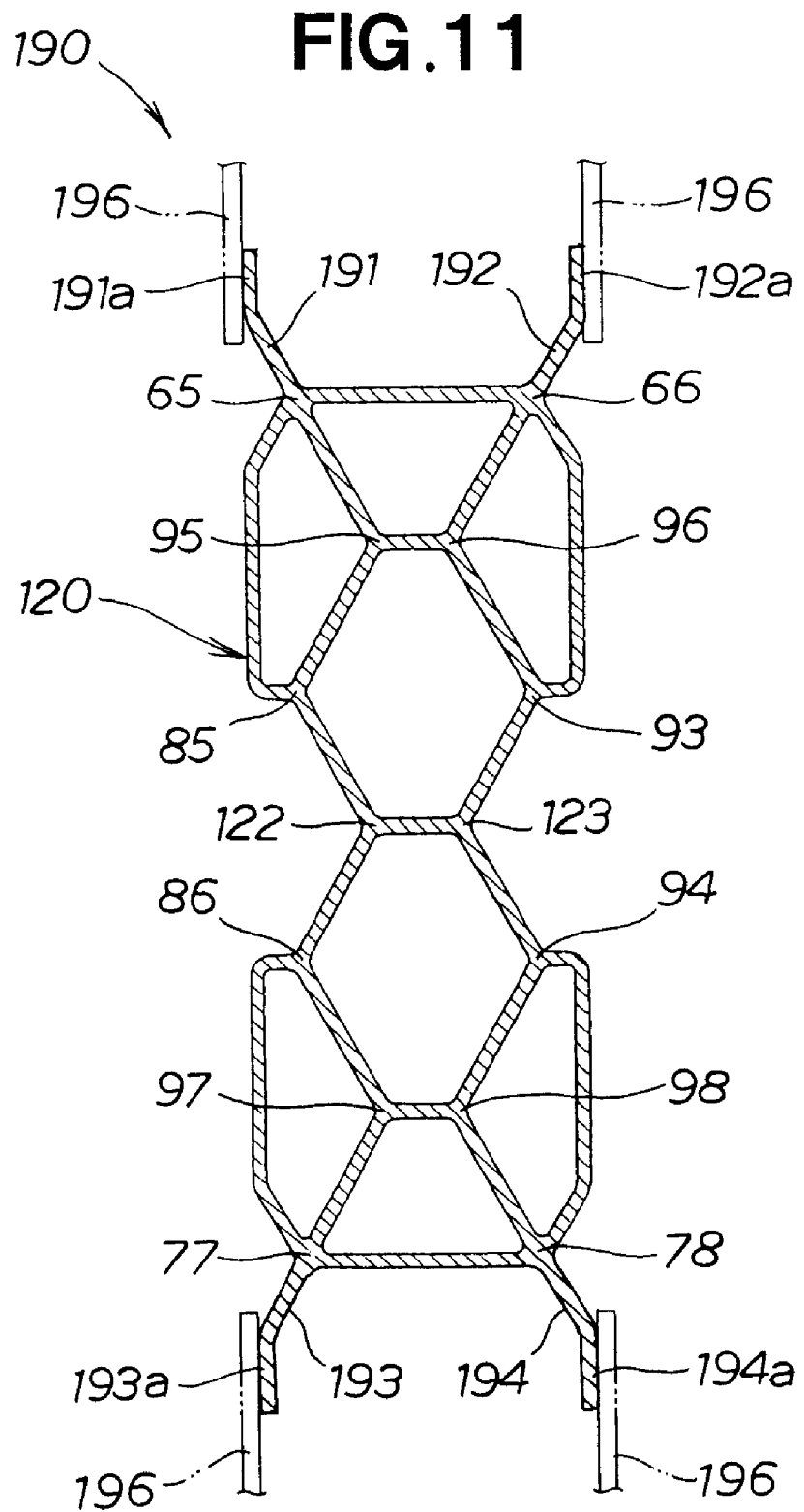
FIG. 11 is a sectional view showing an extruded frame according to a sixth embodiment of the present invention.

FIG. 11 shows the extruded frame of the sixth embodiment.

The front part side frame 190 of the sixth embodiment is a frame in which connecting ribs 191, 192, 193, 194 are respectively installed on the respective apical part 65, 66, 77, 78 of the front part side member 120 of the second embodiment shown in FIG. 7.

In concrete terms, the inclined base part of the upper side left connecting rib 191 is disposed on the upper side left apical part 65, and the inclined base part of the upper side right connecting rib 192 is disposed on the upper side right apical part 66.

The inclined base part of the lower side left connecting rib 193 is disposed on the lower side left apical part 77, and the inclined base part of the lower side right connecting rib 194 is disposed on the lower side right apical part 78.

The abovementioned respective connecting ribs 191, 192, 193, 194 are respectively bent in substantially a dogleg shape, and the respective tip end parts 191a, 192a, 193a, 194a are parallel. Accordingly, other members 196 can be attached parallel to the respective tip end parts 191a, 192a, 193a, 194a.

Since the respective connecting ribs 191, 192, 193, 194 are attached to the respective apical parts 65, 66, 77, 78, and since the respective connecting ribs 191, 192, 193, 194 are further formed in substantially a dogleg shape, the rigidity of the respective connecting ribs 191, 192, 193, 194 can be ensured, and the other members 196 can be firmly supported.

Figure 12:
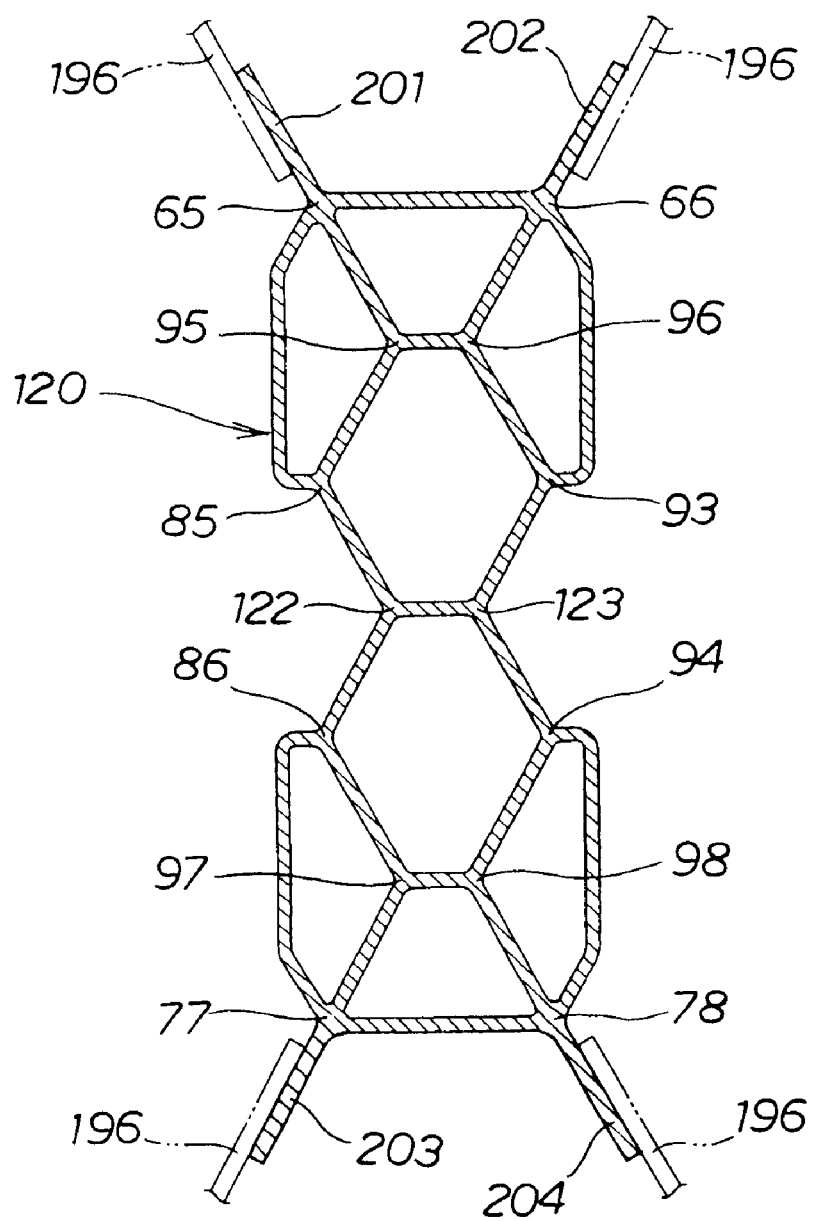
FIG. 12 is a sectional view showing an extruded frame according to a seventh embodiment of the present invention.

FIG. 12 shows the extruded frame of the seventh embodiment.

The front part side frame 200 of the seventh embodiment is a frame in which inclined connecting ribs 201, 202, 203, 204 are respectively disposed on the respective apical parts 65, 66, 77, 78 of the front part side frame 120 of the second embodiment shown in FIG. 7.

In concrete terms, the base part of the upper side left connecting rib 201 is disposed on the upper side left apical part 65, and the base part of the upper side right connecting rib 202 is disposed on the upper side right apical part 66.

The base part of the lower side left connecting rib 203 is disposed on the lower side left apical part 77, and the base part of the lower side right connecting rib 204 is disposed on the lower side right apical part 78.

Since the abovementioned respective connecting ribs 201, 202, 203, 204 are disposed on the respective apical parts 65, 66, 77, 78 at an inclination, these can be attached to the respective other members 196 formed at an inclination.

Since the respective inclined connecting ribs 201, 202, 203, 204 are attached to the respective apical parts 65, 66, 77, 78, the rigidity of the respective connecting ribs 201, 202, 203, 204 can be ensured, and the other members 196 can be firmly supported.

In the first through seventh embodiments, examples were shown in which the dimension in the vertical direction was taken as the long axis dimension H1, H3, or H4, and the dimension in the width direction (lateral direction) was taken as the short axis dimension W1. However, depending on the application of the extruded frame, the dimension in the vertical direction may be taken as the short axis dimension, and the dimension in the width direction may be taken as the long axis dimension.

In the first through seventh embodiments, an aluminum alloy was indicated as an example of a light alloy. However, other light alloys such as titanium alloys or the like may also be used.

The present invention is suitable for use in automobiles equipped with light alloy extruded frames that have a plurality of reinforcing parts inside a hollow peripheral wall part.

Obviously, various minor changes and modifications of the present invention are possible in light of the above teaching. It is therefore to be understood that within the scope of the appended claims the invention may be practiced otherwise than as specifically described.

What is claimed is:

1. A hollow extruded frame formed by extruding a light alloy, comprising:
    a peripheral wall part having an elongated shape with a short axis and a long axis in a cross section perpendicular to a longitudinal direction of the frame, wherein said long axis is longer than said short axis; and
    a plurality of confluent parts formed on at least one of an inner side of the peripheral wall part and the peripheral wall part such that they are positioned in linear symmetry with respect to the short axis,
    wherein each of the confluent parts consist of three wall parts merging together with equal angles of 120° therebetween,
    wherein the plurality of confluent parts include at least one pair of confluent parts disposed symmetrically with respect to the short axis of the elongated cross-sectional shape of the peripheral wall part, and
    wherein the peripheral wall part comprises:
        an upper side peripheral wall part including at least one confluent part;
        a lower side peripheral wall part spaced from the upper side peripheral wall part, the lower side peripheral wall part including at least one confluent part; and
        a connecting wall part, connecting the upper side peripheral wall part to the lower side peripheral wall part,
        wherein the upper side peripheral wall part and the lower side peripheral wall part are disposed symmetrically with respect to the short axis,
    wherein the upper side peripheral wall part includes a first substantially H-shaped rib structure, the first H-shaped rib structure comprising two confluent parts, each of the two confluent parts being disposed symmetrically with respect to the long axis, and the lower side peripheral wall part includes a second substantially H-shaped rib structure, the second H-shaped rib structure comprising two confluent parts, each of the two confluent parts being disposed symmetrically with respect to the long axis, and
    wherein the connecting wall part comprises:
        a first vertical wall with a top end merging with the upper side peripheral wall part and a bottom end merging with the lower side peripheral wall part, and
        a second vertical wall with a top end merging with the upper side peripheral wall part and a bottom end merging with the lower side peripheral wall part,
        wherein the first vertical wall part and the second vertical wall part are disposed symmetrically with respect to the long axis.

2. A hollow extruded frame formed by extruding a light alloy, comprising:
    a peripheral wall part having an elongated shape with a short axis and a long axis in a cross section perpendicular to a longitudinal direction of the frame, wherein said long axis is longer than said short axis;
    a plurality of confluent parts formed on at least one of an inner side of the peripheral wall part and the peripheral wall part such that they are positioned in linear symmetry with respect to the short axis; and
    at least one pair of substantially H-shaped rib structures disposed symmetrically with respect to the short axis, each of the H-shaped rib structures including two of the confluent parts disposed symmetrically with respect to the long axis,
    wherein each of the confluent parts are defined by three wall parts merging together with equal angles of 120° therebetween,
    wherein the peripheral wall part comprises:
        an upper side peripheral wall part including one of the substantially H-shaped rib structures;
        a lower side peripheral wall part spaced from the upper side peripheral wall part, the lower side peripheral wall part including another of the substantially H-shaped rib structures; and
        a connecting wall part, connecting the upper side peripheral wall part to the lower side peripheral wall part,
        wherein the upper side peripheral wall part and the lower side peripheral wall part are disposed symmetrically with respect to the short axis, and
    wherein the connecting wall part comprises:
    a first vertical wall with a top end merging with the upper side peripheral wall part and a bottom end merging with the lower side peripheral wall part, and
    a second vertical wall with a tip end merging with the upper side peripheral wall part and a bottom end merging with the lower side peripheral wall part,
    wherein the first vertical wall part and the second vertical wall part are disposed symmetrically with respect to the long axis.

* * * * *

UNITED STATES PATENT AND TRADEMARK OFFICE
CERTIFICATE OF CORRECTION

PATENT NO. : 7,614,658 B2  Page 1 of 1
APPLICATION NO. : 11/971543
DATED : November 10, 2009
INVENTOR(S) : Yamada It is certified that error appears in the above-identified patent and that said Letters Patent is hereby corrected as shown below:

Column 16, Line 45, (Claim 2), delete "tip" and insert --top--.

Signed and Sealed this

Twentieth Day of April, 2010

David J. Kappos
*Director of the United States Patent and Trademark Office*